N. E. MANN.
ELECTRIC HEATING PAD.
APPLICATION FILED JUNE 23, 1915.
1,161,146.
Patented Nov. 23, 1915.
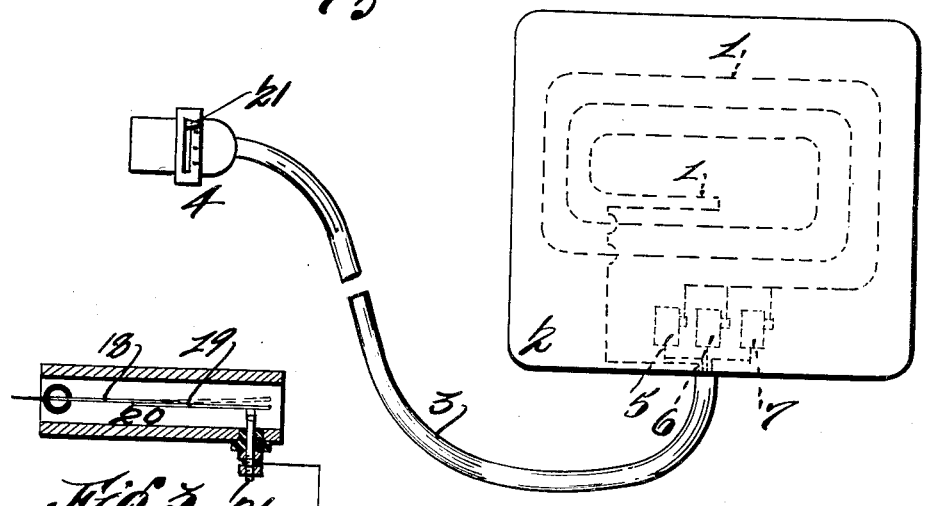
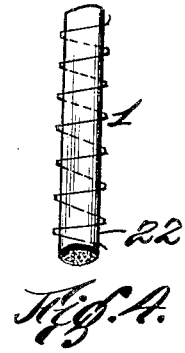
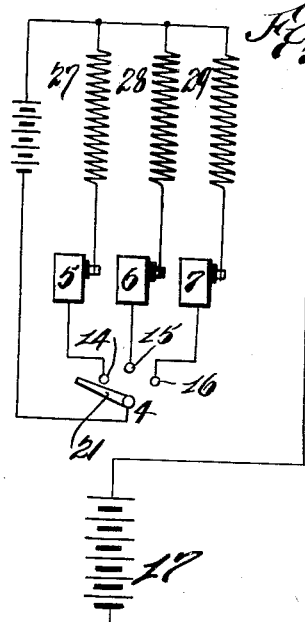
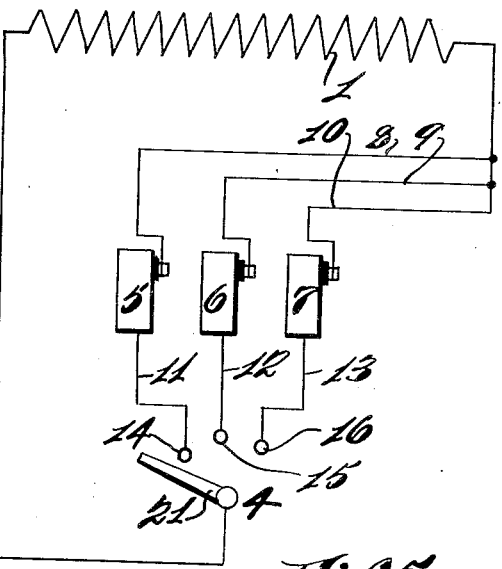
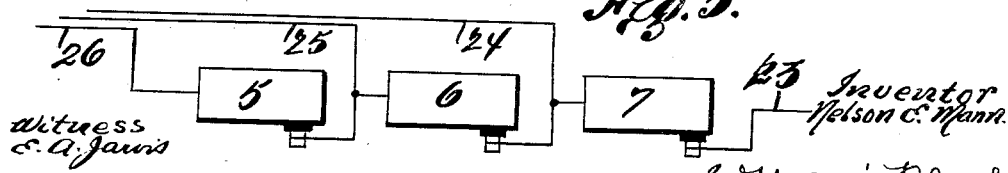
Inventor
Nelson E. Mann.
Witness
E. A. Jarvis
Maurice Bloch
attorney.

UNITED STATES PATENT OFFICE.

NELSON E. MANN, OF COLUMBIA, PENNSYLVANIA, ASSIGNOR TO RELIANCE ELECTRIC HEATING COMPANY, OF COLUMBIA, PENNSYLVANIA, A CORPORATION OF NEW JERSEY.

ELECTRIC HEATING-PAD.

1,161,146.  Specification of Letters Patent.  Patented Nov. 23, 1915.

Application filed June 23, 1915. Serial No. 35,741. REISSUED

*To all whom it may concern:*

Be it known that I, NELSON E. MANN, a citizen of the United States of America, residing at Columbia, Lancaster county, State of Pennsylvania, have invented certain new and useful Improvements in Electric Heating-Pads, of which the following is a full, clear, and exact description.

This invention relates to an improvement in heat regulating devices for electrically heated warming pads and has for an object to provide an automatically operated cut out, or thermostat, that will open the circuit through the resistance coil, when the temperature reaches a predetermined point.

I will now proceed to describe my invention in detail, the essential features of which will be summarized in the appended claims, reference being had to the accompanying drawing, forming part hereof; wherein—

Figure 1 is a diagrammatic plan view of a warming pad embodying my improvement; Fig. 2 is a diagrammatic view illustrating the arrangement of the coil and thermostats; Fig. 3 is a detail view of a common form of thermostat which I employ; Fig. 4 is an enlarged detail of one form of the heating coil which may be used in my pad; Fig. 5 is a fragmentary view illustrating the thermostats connected in series; and Fig. 6 is a diagrammatic view illustrating my improvement as applied to a plurality of resistance coils.

In Fig. 1, which illustrates a common form of electric warming pad, containing a heating coil 1, shown by dotted lines, the said coil is located between the layers of the pad 2. A cable 3 carries the wires, which conduct the current from a switch 4 to thermostats arranged for a single coil, 5, 6 and 7.

To regulate the amount of heat produced, each thermostat is set for different degrees of heat; for instance, the thermostat 5 is set for 120 degrees, which I will term low temperature; the thermostat 6 for 150 degrees (medium temperature), and the thermostat 7 for 180 degrees (high temperature).

As can be seen in Fig. 2, the thermostats 5, 6 and 7 are connected in multiple with the coil 1 by wires 8, 9 and 10. The other side of the thermostats are connected by wires 11, 12 and 13 to the points 14, 15 and 16 of the switch 4. A source of electrical energy 17 supplies the current for the coil, the switch 4 being arranged as a plug to be connected to an electric light socket, for instance. The source of supply 17 is a diagrammatic illustration of a power circuit. The switch 4 is a three-point switch, one point for each thermostat.

I do not limit myself to any particular form of thermostat, a common form being shown in Fig. 3, consisting of a tongue 20 made up of two strips of metal 18 and 19 having different coefficients of expansion. Under normal conditions, the tongue 20 will make contact with a post 21, but when the tongue becomes heated it will show as per dotted lines, and break contact. The amount of heat that will bow the tongue will depend upon the tension of the tongue. As such thermostats are well known and also their action, I will not described them in detail.

As each of the thermostats 5, 6 and 7 is regulated to break contact at a different degree of heat, I am able to obtain and maintain a certain degree of heat, whether one coil is used or a number of coils. Should I desire a low temperature, say 120 degrees, where one coil is used I would throw the switch-arm 21 to the point 14 which will cause the current to flow through the coil 1 by way of the low temperature thermostat 5. As soon as the temperature reaches the point for which the thermostat 5 is set the circuit will open but will close again as soon as the temperature reduces a few degrees, but not enough to make any material difference in the temperature of the pad 2. By this means I am able to maintain the pad at low temperature. For a medium temperature I would move the switch-arm 21 to the point 15, which will cause the current to flow through the coil by way of the thermostat 6, and as this thermostat is set for a little higher degree of heat, the pad will be rendered warmer. For a higher degree of heat, I would move the switch-arm 21 to the point 16, which will cause the current to flow through the coil by way of the thermostat 7. As this latter thermostat is set for a high degree of heat, the pad will become more highly heated.

From the foregoing description, it will be apparent that I obtain different degrees of heat by maintaining the circuit for different periods of time, the current remaining on longer when the thermostat 7 is in circuit than when the thermostats 5 or 6 are in circuit.

The resistance coils may be formed by winding wire of suitable gage around an asbestos rope, as shown in Fig. 4, the rope being indicated by 22. By this means, I am able to produce an exceedingly flexible structure. Instead of connecting the thermostats in multiple for the single coil, as shown in Fig. 2, I may connect them in series, as shown in Fig. 5, in which case the wire 23 will be connected with the coil 1 and the wires 24, 25 and 26 with the switch-points. This arrangement eliminates some of the wiring in the pad 2. Should I employ a number of coils, such as 27, 28 and 29 in Fig. 6, I would connect the thermostat 5 with the coil 27, for instance; the thermostat 6 with the coil 28, and the thermostat 7 with the coil 29. In this latter form each coil is independently heated and controlled; its connected thermostat will control the duration of the flow of current therethrough and the effect will be the same as when one coil is used. The three coils 27, 28 and 29 will be preferably of the same resistance. In this latter form each thermostat will be connected to a corresponding point of the switch 4.

Having now described my invention, what I claim and desire to secure by Letters Patent is:

1. Electrical heating means for warming pads, consisting of a single resistance coil, an electric circuit therefor, and a plurality of independently acting circuit controlling devices included in said circuit, each device being arranged to open the circuit at a different degree of heat, each of said devices having a different coefficient of expansion.

2. Electrical heating means for warming pads, consisting of a resistance coil, an electric circuit therefor, and a plurality of independently acting circuit controlling devices included in said circuit, each controlling device being arranged to open the circuit when the coil becomes heated to a predetermined extent, each controlling device being set to open the circuit at a different degree of heat.

3. Electrical heating means for warming pads, consisting of a single resistance coil, an electric circuit therefor, and a plurality of thermostats included in said circuit, each thermostat being set to open the circuit when the coil becomes heated to a predetermined extent.

4. Electrical heating means for warming pads consisting of a single resistance coil, a circuit therefor, a plurality of thermostats, one pole of each thermostat being electrically connected to one end of said coil, a switch having a contact for each thermostat, each contact being connected to the other pole of a corresponding thermostat, and a circuit-closing arm carried by the switch, said arm being in circuit with the source of electrical supply, each of said thermostats being set to open the circuit at a different degree of heat.

Signed at Columbia, Pa., this 21st day of June 1915.

NELSON E. MANN.

Witnesses:
CHESTER C. ROJC,
CHARLES M. FREE.